Aug. 11, 1942.     C. C. HINER     2,292,519
FISHING POLE
Filed Jan. 7, 1941
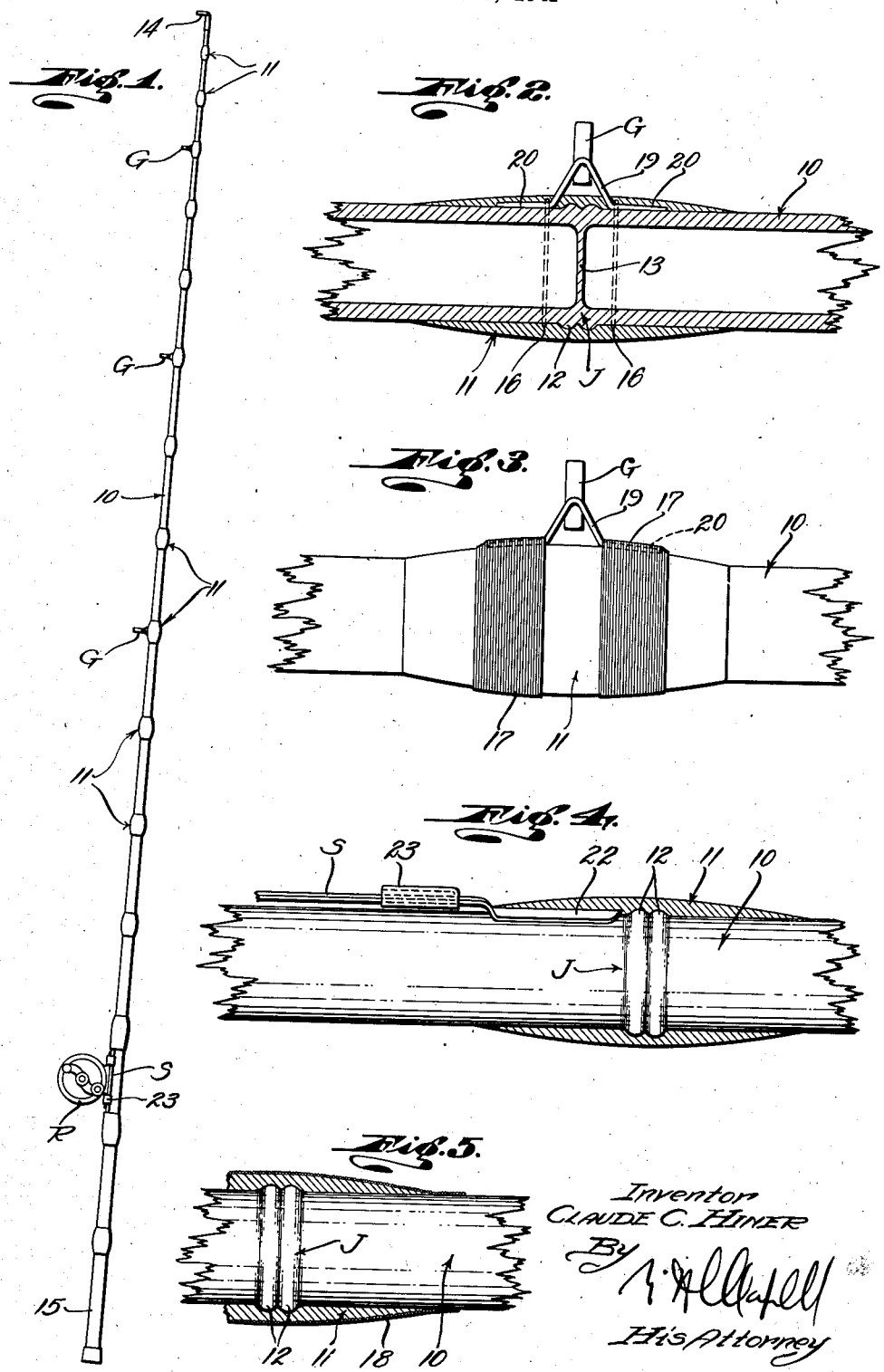

Patented Aug. 11, 1942

2,292,519

UNITED STATES PATENT OFFICE 2,292,519

FISHING POLE

Claude C. Hiner, Newport Beach, Calif.

Application January 7, 1941, Serial No. 373,427

10 Claims. (Cl. 43—18)

This invention relates to fishing poles and it is a general object of the invention to provide a strong, dependable bamboo fishing pole.

It has long been the practice to construct certain classes of fishing poles of bamboo. Bamboo fishing poles possess many highly desirable characteristics but are often weak at the natural joints of the bamboo wood and sometimes break at these points. Further, it is difficult to secure the line guides to the bamboo poles and in most cases the guides and other fittings are held in place by wrappings of cord, or the like, and are subject to displacement and loss.

Another object of this invention is to provide a bamboo fishing pole which is effectively strengthened or reenforced at the natural joints.

Another object of this invention is to provide a fishing pole of the character mentioned in which the means for reenforcing the natural joints are light in weight, attractive in appearance and easily and quickly applied.

Another object of this invention is to provide pliable attractive means for reenforcing the natural joints of a bamboo fishing pole which do not interfere with the free flexing of the pole, which do not alter the balance of the pole and which fully conceal the unsightly bamboo joints.

Another object of this invention is to provide a fishing pole of the character referred to having novel, dependable and inexpensive means for mounting and securing the line guides, reel seat and other fittings.

A further object of this invention is to provide a bamboo fishing pole of the character mentioned in which the means for strengthening the natural bamboo joints may be utilized to permanently and securely anchor or attach the line guides, reel seat, etc.

The various objects and features of my invention will be fully understood from the following detailed description of typical preferred forms and applications of the invention, throughout which description reference is made to the accompanying drawing, in which:

Fig. 1 is a side elevation of a fishing pole embodying features of the invention. Fig. 2 is an enlarged longitudinal detailed sectional view of the pole illustrating a means for strengthening a joint and showing a line guide secured at the joint. Fig. 3 is an enlarged fragmentary side elevation of the pole showing the joint strengthening collar in elevation and illustrating another means for anchoring a line guide and for reenforcing the collar. Fig. 4 is an enlarged fragmentary elevation of the pole showing one end of the reel seat anchored in a strengthening collar at a joint of the pole, the collar appearing in longitudinal cross section and Fig. 5 is a fragmentary side elevation of the pole showing a joint strengthening collar with a reenforcing wrapping, the collar and wrapping appearing in longitudinal cross section.

The present invention is capable of considerable modification and may be embodied in bamboo fishing poles of different sizes, intended uses, etc. In the following detailed disclosure I will describe a typical preferred form of the invention with certain alternative constructions. It is to be understood that the invention is not to be construed as limited or restricted to the particular details set forth but is to be taken as including any features or modifications that may fall within the scope of the claims.

The improved fishing pole of this invention may be said to comprise, generally, a bamboo pole body 10, and sleeves or collars 11 for strengthening the joints J of the bamboo body 10 and adapted to mount or anchor the line guides G, the reel seat S and other fittings.

In accordance with the invention the fishing pole body 10 is formed of natural unsplit bamboo. It is preferred to construct the pole body 10 of a good grade of Calcutta bamboo or the equivalent and to clean, smooth and finish the bamboo in the usual manner. The invention contemplates forming the pole body 10 of a single continuous length of bamboo or constructing the body of such a length of bamboo divided into several sections so that it may be folded or taken apart when not in use. In the present case it will be assumed that the body 10 is a one piece continuous length of bamboo wood. As is usual with bamboo the body 10 tapers from its shank or grip end to its tip and has a multiplicity of spaced joints J. These joints are characterized by one or more annular external ridges 12 and transverse partitions 13 which divide the interior of the hollow bamboo body into a number of cells. The bamboo is sometimes rough and irregular in shape at its joints J. The fishing pole body 10 may be provided at its outer end with the usual line guiding tip 14 and its shank and may have a suitable grip 15.

The sleeves or collars 11 for reenforcing the joints J are important elements of the invention. The collars 11 serve to strengthen the pole where breakage might occur and may be utilized to anchor or secure the line guides G, the reel seat S and other fittings. It is preferred, although not necessary, to provide a strengthening collar 11 at each of the several joints J and the sleeves or collars 11 may be the same or substantially the same at the several joints.

The strengthening collars 11 comprise annular or tubular bodies of plastic material applied to or molded on the pole body 10 at the joints J. While the invention contemplates the employment of different or selected plastic materials I have found it desirable to form the strengthening collars 11 of what is known and marketed as plastic wood, for example, I may use the class of material disclosed in United States Patent No. 1,838,618, granted December 29, 1931, and therein described as a plastic composition comprising nitrocellulose in a solution containing a volatile liquid and a finely divided cellulose filler in such proportions as to harden upon exposure to air to substantially the rigidity and solidarity of wood. It is preferred to employ a high grade plastic composition of the class just mentioned. The composition is a doughy putty-like material which is easily applied, molded and shaped.

The material is molded on or otherwise applied to the pole body 10 to form continuous annular collars 11 which extend along the pole in both directions from the joints J. The pole body 10 is preferably cleaned at the joints J before applying the collars 11 to assure the full adherence of the plastic material and the material is applied to obtain the best adherence and to constitute continuous uniform sleeves or collars. While the strengthening collars 11 may be given various shapes I prefer to shape them substantially as illustrated so that they are of maximum thickness at the joint ribs 12 and taper away toward their ends to have their surfaces merge with the surface of the pole body 10. The surfaces of the strengthening collars 11 are preferably smooth and regular, although they may be given surface graining or other ornamentation if desired. The material or plastic composition employed to form the collars 11 may be of a color which corresponds to or which contrasts with the color of the bamboo body 10 which, of course, may be of any color. The plastic composition constituting the collars 11 quickly hardens to have substantially the same characteristics as the wood of the pole body 10 and when hardened is resistant to water and most other liquids, is flexible to about the same degree as the bamboo and has substantial strength.

Where the collars 11 are shaped and formed as just described, they extend a considerable distance along the pole at each side of their respective joints to effectively reenforce and strengthen the bamboo throughout considerable areas. As illustrated in Fig. 1 the strengthening collars 11 may be progressively smaller from the large end of the pole toward the tip of the pole, their lengths and thicknesses being generally in proportion to the size of their respective joints J. The strengthening collars 11 may be finished in the same way as the pole body 10, for example, they may be varnished, painted, etc. In this connection it will be observed that the smooth, gradually tapering collars 11 are attractive in appearance and completely conceal the bamboo joints J which are often rough and unsightly.

The collars 11 may or may not be reenforced depending to a large extent upon the condition and character of the bamboo body 10 and upon the intended use of the pole. Where it is desired to add reenforcements to the collars 11 wires, straps, or the like, of metal may be embedded in the material of the collars or may be wrapped on the pole body 10 at the joints to be covered by and embedded in the collars. Thus, in Fig. 2 of the drawing there are two spaced rings or bands 16 wrapped on the body 10 at or adjacent the opposite ends of the joint J to be cast or embedded in the material of the collar 11. In other cases it may be preferred to strengthen the collars 11 by wrapping cord, wire, or the like, on their exteriors. This is illustrated in Figs. 3 and 5. In Fig. 3 of the drawing there are two spaced wrappings 17 of cord, or the like, on the exterior of the collar 11. The wrappings 17 may be of substantial length and may be equally spaced from the center of the collar. In the arrangement illustrated in Fig. 5 of the drawing there is a single continuous wrapping 18 of cord, wire, or the like, completely covering the plastic strengthening collar 11. In this case the wrapping 18 may have its end portions engage directly on the pole body 10 at or beyond the opposite ends of the collar 11. The wrappings 17 and 18 may be applied immediately following the formation of the collars 11 or after the material of the collars has finally hardened. In either case, the wrappings 17 and 18 may be painted, varnished, or otherwise treated to be water resistant and to be long wearing. It will be apparent that the strengthening collars 11 may be provided with both the internal reenforcing bands 16 and the external wrappings 17 or 18 where this is believed necessary. It will be seen that the collars 11 not only form effective reenforcements for the bamboo joints J but afford a desirable means for incorporating the metal strengthening bands 16 and/or the wrappings 17 and 18 in the pole structure.

In accordance with the invention the plastic material strengthening collars 11, or some of them, may be utilized to secure or anchor the line guides G, the reel seat S, and other fittings to the pole body 10. The pole illustrated in Fig. 1 has a plurality of spaced line guides G anchored in spaced collars 11. The guides G may be of any selected type. In the case illustrated the guides G are provided with divergent legs 19 having elongate mounting flanges or feet 20. The feet 20 and parts of the legs 19 may be embedded directly in the plastic material of the collars 11. In this case the feet 20 may rest or bear directly on the surface of the bamboo body 10 at opposite sides of the joints J. This construction is illustrated in Fig. 2 of the drawing. The hard wood-like material of the collars 11 encasing the feet 20 and parts of the legs 19 securely fix the guides G on the fishing pole.

Where the reenforcing bands 16 are employed they may be utilized to assist in securing the guides G to the body 10. As shown in Fig. 2 of the drawings the bands 16 may engage over the feet 20 so that the line guides G are secured or anchored by the metal bands as well as by the plastic material collars 11. In some cases the bands 16 may be employed primarily to assist in anchoring the guides G while in other cases the bands may be employed primarily to assist in strengthening the bamboo pole body 10, but in either case they may serve both purposes. The guides G may be secured or attached by the strengthening wrappings on the collars 11. Thus, in Fig. 3 of the drawing, a guide G has its feet 20 bearing on the external surface of a strengthening collar 11 and the above described wrappings 17 of cord, or the like, engage over the feet to secure the guide in place.

Figs. 1 and 4 of the drawing, illustrate one manner in which the reel seat S may be anchored or secured to the pole body 10 by means of the joint strengthening collars 11. The means employed to mount the reel seat depends upon the character of the seat and its fittings and the seat securing means may be varied to suit different types of seats. The reel seat S shown in the drawings is of simple form, being an elongate metal element with depressed end parts 22 shaped to conform generally to the surface of the pole. The seat S has slides 23 or other means for detachably securing the reel R. The depressed parts 22 of the reel seat S are embedded or partially embedded in two spaced adjacent joint collars 11. The parts 22 may be arranged to bear directly on the body 10 and the collars 11 may be molded or formed to extend over them and thus anchor the seat in place. Where the spacing of the joints J makes it impractical to secure the seat S by collars 11 at two adjacent joints, the seat may have one of its parts 22 embedded in a collar 11 at a selected joint J and the other part 22 may be seated in a special or additional collar 11 of the plastic material formed on the bamboo body at a point spaced from the two adjacent joints J. The collar 11 appearing in Fig. 4 of the drawings and utilized to fix one end part 22 of the reel seat S does not embody the reenforcing bands 16 or the wrappings 17 or 18, it being understood that such additional reenforcing elements may be embodied in the collars 11 which anchor the reel seat S.

It is believed that the utility and practicability of the construction of this invention will be readily apparent from the foregoing detailed description. The plastic wood collars 11 reenforce the several joints J to prevent the joints from breaking. The material of the collars 11 has the characteristics of natural wood and firmly adheres to the natural bamboo of the pole body 10 so that the collars in effect form integral and continuous elements of the pole body. The strengthening collars 11 completely conceal the more or less irregular natural joints J and add to the appearance of the pole. In addition to strengthening the joints J the plastic material collars 11 constitute dependable means for anchoring or fixing the line guides G, the reel seat S and any other required fittings. Such fittings may have parts molded or embedded directly in the hard rigid material of the collars 11 to be firmly and dependably fixed to the pole. The fishing pole is inexpensive and is quickly made.

Having described typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A fishing pole comprising a length of bamboo forming the body of the pole and having one or more natural joints, and tubular collars of wood-like plastic material permanently adhering to the joint portions of the bamboo body to reenforce the same.

2. A fishing pole comprising an uninterrupted length of bamboo having spaced natural joints, and bodies of plastic material having substantially the same characteristics as wood covering and adhering to said joints to strengthen the bamboo at the joints.

3. A fishing pole comprising a length of bamboo having spaced natural joints, and bodies of plastic material having substantially the same characteristics as wood covering said joints to strengthen the bamboo at the joints, said bodies having their thickest parts at the joints and tapering away from the joints longitudinally of the pole.

4. A fishing pole comprising a bamboo body having natural joints, plastic material molded over the joints to strengthen and conceal the same, and a line guiding element having a part embedded in said material at a joint to be secured thereby.

5. In a fishing pole, a length of bamboo having a natural joint, a body of rigid material molded on the joint to reenforce the same, and a line handling device having a part set in said material to be anchored thereby.

6. A fishing pole comprising a bamboo body having natural joints, plastic material molded over the joints to strengthen and conceal the same, and reenforcing bands embedded in said material.

7. A fishing pole comprising a bamboo body having natural joints, plastic material molded over the joints to strengthen and conceal the same, and wrappings on said material.

8. In a fishing pole, a length of bamboo having spaced natural joints, strengthening collars of plastic material molded on the joints, and a reel seat having parts embedded in the collars of adjacent joints to be secured thereby.

9. In a fishing pole, a body of bamboo having a natural joint, a line guide having mounting parts, bands on the body engaging over said parts to secure the guide, and a collar of plastic wood molded on the joint to encase the bands and portions of said parts and strengthening said joint.

10. A fishing pole comprising a bamboo pole body having spaced natural joints, and an adhesive plastic material molded on the body to permanently adhere thereto and cover said joints.

CLAUDE C. HINER.